United States Patent [19]
Acharya

[11] Patent Number: 6,009,206
[45] Date of Patent: Dec. 28, 1999

[54] COMPANDING ALGORITHM TO TRANSFORM AN IMAGE TO A LOWER BIT RESOLUTION

[75] Inventor: Tinku Acharya, Tempe, Ariz.

[73] Assignee: Intel Corporation, Santa Clara, Calif.

[21] Appl. No.: 08/940,458

[22] Filed: Sep. 30, 1997

[51] Int. Cl.⁶ .............................. G06K 9/38; G06T 9/00; G06T 5/40; H04N 1/41
[52] U.S. Cl. .................. 382/251; 382/168; 382/271; 358/429; 358/455; 358/466; 348/222; 348/231
[58] Field of Search .................. 358/448, 455, 358/461, 466, 522; 382/168, 169, 251, 172, 237, 270, 271; 348/222, 231

[56] References Cited

U.S. PATENT DOCUMENTS

| | | | |
|---|---|---|---|
| 4,326,258 | 4/1982 | De La Guardia | 358/282 |
| 4,493,106 | 1/1985 | Farhangi et al. | 382/271 |
| 4,922,340 | 5/1990 | Iwai | 358/455 |
| 5,680,477 | 10/1997 | Asada | 382/169 |
| 5,715,378 | 2/1998 | Fujimoto et al. | 395/109 |

*Primary Examiner*—Scott Rogers
*Attorney, Agent, or Firm*—Blakely, Sokoloff, Taylor & Zafman LLP

[57] ABSTRACT

What is disclosed is a mapping circuit configured to map a range of captured intensity values to a companded intensity level based upon the density of captured intensity values present in the captured image. Also provided is a companding circuit coupled to the mapping circuit, the companding circuit configured to replace each pixel of the captured image with a corresponding mapped intensity value pixel. The companding circuit and mapping circuit are configured to preserve image characteristics.

13 Claims, 6 Drawing Sheets

COMPANDING ALGORITHM TO TRANSFORM AN IMAGE TO A LOWER BIT RESOLUTION

BACKGROUND OF THE INVENTION

1. Field of the Invention

The invention relates generally to the field of digital image processing. More specifically, the invention relates to methods and apparatus for image representation and enhancing digital image compression techniques.

2. Description of the Related Art

In digital imaging, which is the process of capturing and representing into digital form a real image, there is a tradeoff between the size and accuracy of the digital image. Typically, as the size of an image (when digitally represented) is increased, the resultant quality of the digital image (when compared to the original) is also increased. One particular step in the imaging process where this is particularly true when a captured image undergoes "companding." Companding is the procedure by which a higher resolution pixel is reduced to a lower resolution. The typical image sensor, the focal device which initially captures a light or color intensity of an image, generates pixels of 10 or more bits based on the analog-to-digital conversion characteristics. Thus, for example, when a digital still camera takes a picture, the image is first represented by the sensing elements as a group of color/intensity values which can have $2^{10}$ or 1024 possible values. Pixels from an image sensor that compose a captured image however, are not optimized for most image processing/compression algorithms which are designed for pixel values in multiples of 8 bits. This is due primarily to the fact that image processing has traditionally been performed on computer systems where the unit of a "byte" (8 bits) served as a basis of computer system architectures. Thus, a vast majority of image compression schemes and techniques, as well as image representation methods, are designed around the 8-bit (byte) model. To take advantage of these pre-existing techniques and to interface digital cameras with computer systems, it would thus be advantageous to reduce all pixels of 10 bit resolution to pixels of 8 bit resolution.

While doing so, it would also be desirable to preserve key image information such as edges, shading and color. The crude method for companding involved a mere truncation of the 2 least significant bits. This equates to dividing the pixel value by four. Such a simple linear transformation does not take into account the statistical properties of the image, i.e., how pixel values are clustered or distributed throughout the image. For instance, if an image contains a pixel value that repeatedly occurs, and then at a particular location, changes slightly, this information should not be lost. Assume for example a solid color region of an image which fades into a different color. The boundary pixels between the solid color and the faded portion should be appropriately represented. For instance, if the solid color region has values of say 514 and the boundary pixel a value of 513, the traditional companding technique would reduce these pixels both to a value of 128. Thus, the edge information represented by the boundary pixel 513 between the faded region and the solid color region is lost and the edge will disappear in the digital image.

The end result visually to the human eye of any companding is a change in the contrast of each pixel from bright to dark. If the companding process is performed in a straightforward linear mapping as in the prior art discussed earlier the change in contrast will reduce the detail information of the image, and thus, lower the image quality. However, if companding can be achieved in a manner more indicative of the characteristics of the image, then the resultant change in contrast will also preserve the essential image features or characteristics.

It would be desirable to compand in an intelligent manner to preserve more details and key characteristics of an image by taking into account the density, distribution and variation in pixels. Further, it would be advantageous to compand in a manner that is suited to implementation in VLSI (Very Large Scale Integration) circuits such as those found in low cost imaging devices.

SUMMARY OF THE INVENTION

What is disclosed is a mapping circuit configured to map a range of captured intensity values to a companded intensity level based upon the density of captured intensity values present in the captured image. Also provided is a companding circuit coupled to the mapping circuit, the companding circuit configured to replace each pixel of the captured image with a corresponding mapped intensity value pixel.

BRIEF DESCRIPTION OF THE DRAWINGS

The objects, features and advantages of the method and apparatus for the present invention will be apparent from the following description in which.

DETAILED DESCRIPTION OF THE INVENTION

Figure 1:
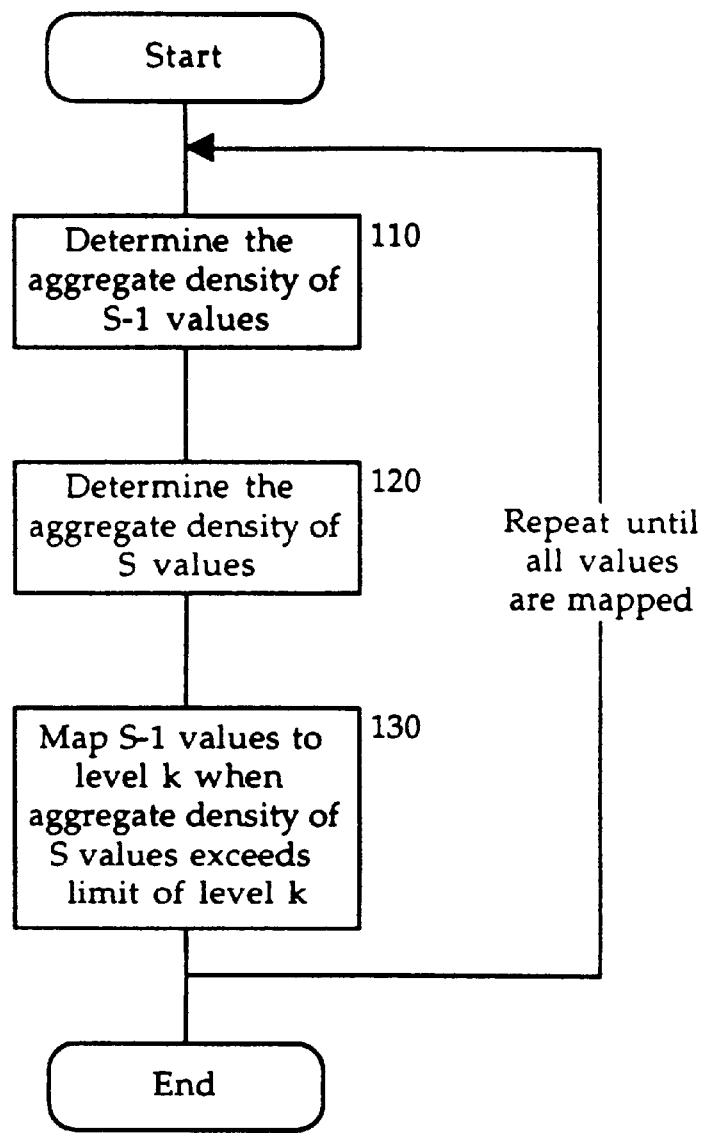
FIG. 1 illustrates a flow diagram of one embodiment of the invention.

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

In a L-bit resolution imaging device, each pixel of the image can have a color or intensity value (in the case of gray scale) from 0 to $2^L-1$ or a total of $2^L$ possible values. The goal of the companding process is to reduce the L-bit resolution to a lower resolution, and in most systems this entails reducing a captured 10-bit color/intensity resolution image to an 8-bit color/intensity resolution image. Thus, in most systems, 1024 possible color/intensity values must be mapped to 256 color/intensity values. Consequently, each pixel of the captured image must be replaced with a "companded" value according to the resultant mapping. Ordinarily, not all 1024 pixel values may appear in the captured image, and of those that do appear, they will be present in the image with varying "density" ("density" is defined as the number of occurrences of a color/intensity value within an image or portion thereof). The methodology and apparatus for determining such density counts within an image capture device will be described in the various embodiments of the invention.

In the prior art, companding was achieved using a linear mapping, for instance, the companding may be as mechanical as dividing each pixel by a companding ratio $2^{(L-J)}$ where L is the original bit resolution of the captured images and J, the desired companded resolution. Such a division of every pixel ignores the distribution of certain values as compared to others. By this uniform treatment, many important image features are lost in the resultant companded image.

The invention provides an intelligent companding methodology. The methodology and apparatus described in the various embodiments of the invention preserves image features after companding and results in a more uniform contrast change. While the discussion below refers to intensity (gray scale) values, the invention in its various embodiments applied equally to images with more than one intensity (color) plane, such as an RGB image. The methodology and apparatus described can be applied independently to each color plane, and thus, provides the same advantages of preserving image features and uniform contrast reduction.

When mapping an entire range of intensity values from a value r to a value of r+M to the value k, the range of values must fall, their densities of occurrence are summed together, within a certain "Limit" value. The Limit depends upon the "level", k, of the compounded intensity such that $$\text{Limit} = \left(\frac{k+1}{2^J}\right) M * N,$$

where M*N is the image size in pixels. If mapping an L-bit color resolution image to lower J-bit resolution, then the Limit value will be a multiple of $2^{-J}$ for Starting with k=0, a first range of values will be mapped to a companded intensity 0. Then k is increased to "1", which is the next level to which the next range of values is mapped. For example, when k=0, assume that the density counts for original intensity values 0, 1, 2, 3, 4, 5, and 6 meet the limit. Thus, the values 0 through 6 will be mapped to "0". Next, if k is increased to 1, making the limit change to $(2/2^J)*M*N$, assume that the density counts aggregated for original intensity values 7, 8, 9, 10 reach the new limit, then 7–10 will be mapped to the level 1. By repeating this process for all possible captured intensity values, an intelligent mapping based on image characteristics may be achieved.

FIG. 1 illustrates a flow diagram of one embodiment of the invention.

One way to achieve the mapping is illustrated in the flow diagram of FIG. 1. The first step in the mapping procedure according to this embodiment of the invention is to determine the aggregate density of the first S-1 values from the starting value r (step 110). Once this sum is determined, then the next step is to determine the aggregate density of the first S values starting from r (step 120). The aggregate density of the S-1 values can be added to the density of intensity value S to obtain the aggregate density of S values as desired by step 120, and therefore, less compute intensive to achieve that step 110 which may require more addition computations than the single addition needed for step 120.

Once the aggregate intensity value densities for S and S-1 values are determined, the next step is to complete the companding of those S-1 values is to map them to the level of the range of values being mapped if the aggregate density meets the limit value condition. This condition can be represented by the following expression:

$$\sum_{i=0}^{S-1} p(i+r) < \text{Limit} \leq \sum_{i=0}^{S} p(i+r)$$

such that $$\text{Limit} = \frac{(M*N)(k+1)}{2^J}$$

for every level (k) from 0 to 2j-1 and r such that r=r+S, r+0 initially where J is the number of bits desired for each pixel in the companded image. Thus, a mapping to the level k (i, i+S) may be accomplished if the aggregate densities of those N-1 color values is less than the limit $$\frac{(k+1)}{2^J}$$

at level k and the aggregate density of S values exceeds that limit (step 130). The companding procedure is completed when all possible intensity values $(0,2^L-1)$ are mapped, which involves repeating the methodology illustrated in FIG. 1 until all $2^L$ such possible values have been mapped.

In the case of 10-bit color value resolution image being companded to an 8-bit color resolution, the lowest or level 0 limit value would be $$\frac{M*N}{256}.$$

In such an instance, an upper limit mapping behavior would have to be ensured such that no values beyond 255 are remaining in the companded image. The procedure illustrated in FIG. 1 and described above may be efficiently implemented by starting at an initial r value of 0 (level 0, k=0) and by finding the first range of values from the companded image that are to mapped to an 8-bit value of 0. For example, the density counts may dictate, based on the above described limit condition, that the values 0 through 23 are all mapped to 0. Then the next "r", which is the bottom value of the range for level 1(k=1) would start at 24, and thus the values from 24 to some maximum in the range as determined by the formula would be mapped to a companded value of 1, which is also the "level" or value of k.

In this manner, the density and occurrence of color/intensity values is taken into account when the mapping is performed so that values occurring often are ensured of getting finer representation than others.

Figure 2:
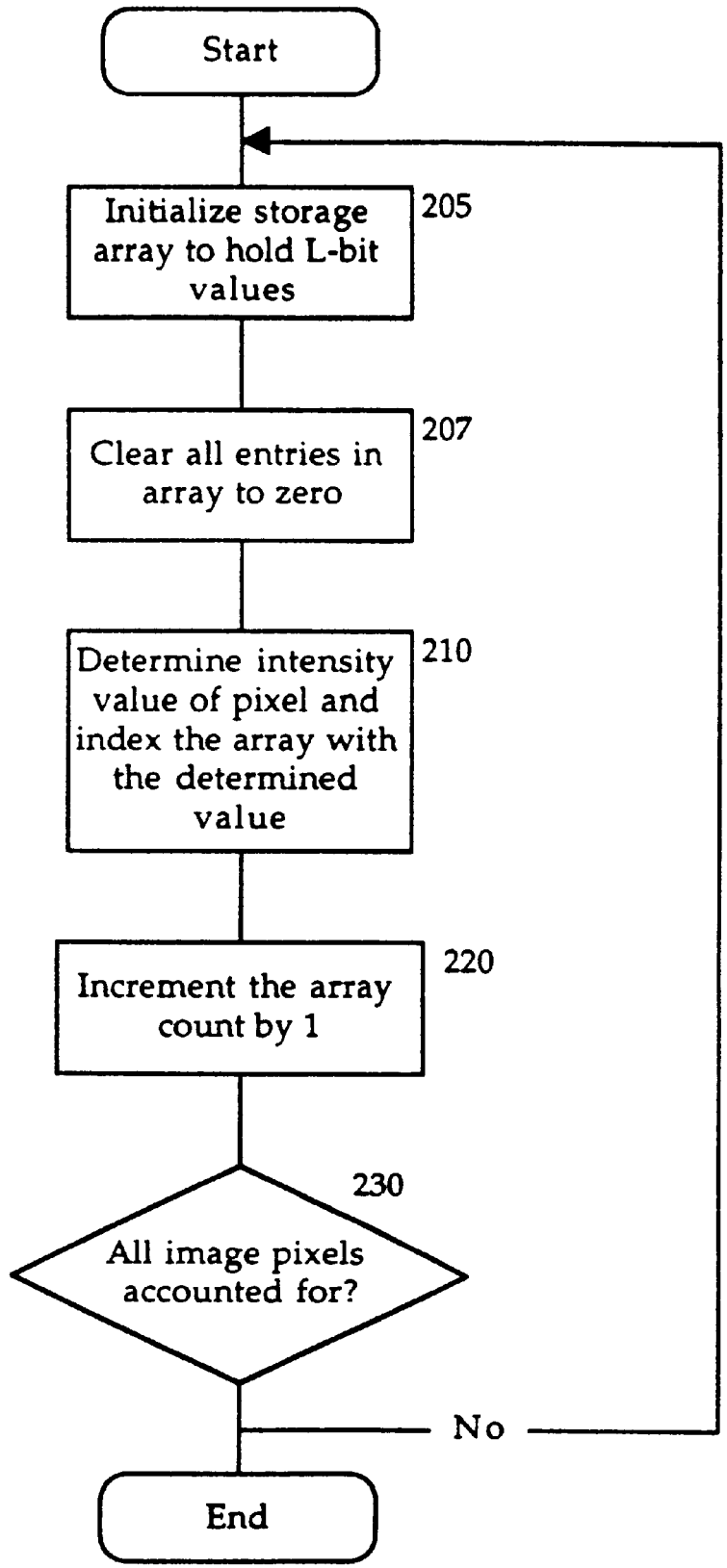
FIG. 2 illustrates a flow diagram of a method for determining and storing intensity value density counts according to one embodiment of the invention.

FIG. 2 illustrates a flow diagram of a method for determining and storing intensity value density counts according to one embodiment of the invention.

Before the companding procedure shown in FIG. 1 can be carried out, the individual intensity value density count for each intensity value in the range $(0,2^L-1)$ must be determined. When an image sensor or other focal device captures an image, it does so by producing a set of pixels which have color values for every location in the image area having dimensions rectangularly of M by N. Depending upon the "fineness" or capture area of digital and/or analog photocells in the focal image capture device, the M*N area will be captured as a number of pixel intensity values which collectively define the captured image area or view of the imaging device.

One method to compile and store intensity density counts for use by the companding procedure shown in FIG. 1 is illustrated in FIG. 2. As individual pixels of an image are captured and their intensity values are determined by the imaging device (sensor), an intensity density count table or array can be updated. Alternatively, the entire captured image may be stored and later analyzed for intensity count. The storage array will be initialized to have $2^L$ elements, each element indexed by an L-bit value, each element capable of storing an L-bit density count (step 205). Then, the array will be flushed by clearing all entries with a zero value (step 207). When a pixel's intensity value is determined, that value can be used to index an entry the storage array (step 210). The L-bit density count for that particular intensity value is then incremented by one (step 220). As shown below with respect to FIG. 4, the incrementing can be achieved by an ADD of the previously stored density count with the value 1. This value can then be rewritten into the table. If more pixels remain to be captured for a particular image or frame, the next pixel is fetched and the steps 210 and 220 are repeated. When all pixels composing a particular captured image are accounted for (checked at step 230) and their intensity values compiled into the intensity value density array (by repeatedly performing steps 210 and 220), the array will represent a complete accounting of intensity value densities for the entire captured image. This array can then be used in the companding procedure described in FIG. 1 above. The completed density table can then be utilized to compand or map the original captured pixels into a lower bit resolution in regard to intensity value.

Figure 3:
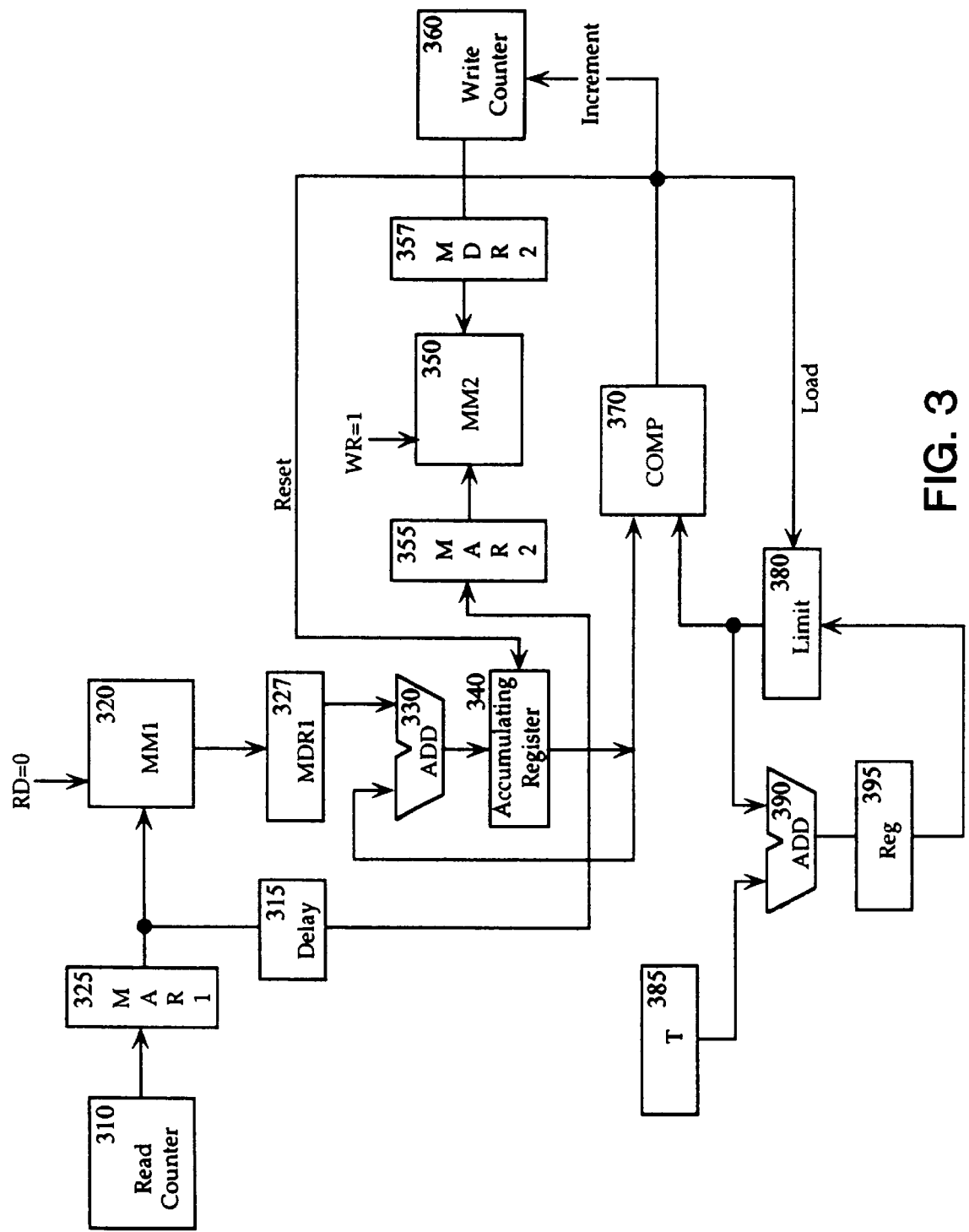
FIG. 3 shows an image companding architecture according to one embodiment of the invention.

FIG. 3 shows an image companding architecture according to one embodiment of the invention.

FIG. 3 implements an image companding algorithm that accounts for the density of each intensity value when deciding upon its mapping. FIG. 3 shows two memory modules MM1 320 and MM2 350 such as a RAM arrays. MM1 320 is designated to hold the density of each L-bit intensity value in the original captured image, and thus will comprise addressing values of 0 ... $2^L-1$. Each entry in table MM1 320 should be capable of storing a value equal to the total number of pixels in the entire captured image. Thus, if the captured/sensed image has M rows and N columns of pixels then each entry of MM1 320 should be capable of storing a value up to M*N. Thus, for a 10-bit intensity generated by the sensor device capturing an image of size 1024 by 768 in pixels, MM1 320 will have addressing index values from 0 to 1023 with each address be capable of holding a maximum value of 786,432 (1024*768) or 20 bits. The table MM1 320 will, prior to the activation of the FIG. 3 circuit contain all the densities for each intensity value and thus, does not have to be written to during the operation of the FIG. 3 companding circuit but only read from. MM2 350 is designated to hold the resultant mapping generated from the analysis of the densities of the image intensity values. The table MM2 350 will also comprise $2^L$ entries, with each entry storing an 8-bit value corresponding to the mapped intensity for each original intensity value. MM2 350 will be initially empty at the start of the operation of the FIG. 3 circuit, but will be written to with mapping values such that it is complete at the end of the circuit operation for a given image.

In the example shown, a Read Counter 310 is configured/designed to count from 0 to 1023 providing an address for each possible intensity value of the captured original image. The output of Read Counter 310 is coupled to the input of a MAR1 (Memory Address Register) 325 which services MM1 320 by providing an index (address/location) to it such that data can be read out from that address when the read line (RD) is activated for MM1 320. To calculate the sum of probabilities/densities, p(k) through p(k+r), MAR1 325 provides, in turn, the addresses of k to k+r from the output of Read Counter 310 to MM1 320 when RD (the read control line) is activated. MM1 320, in response to each address k to k+r it is indexed by, returns the density value stored in that address. The density value output by MM1 320 is provided to a Memory Data Register (MDR) MDR1 327. The output of MDR1 327, which represents the density of a particular intensity value is input to an adder (ADD) 330. At the beginning of a particular "cycle" (set of N densities being added together), an Accumulating Register 340 is reset to zero. Accumulating Register 340 stores at each cycle the output of ADD 330 while also providing that value as one input to ADD 330 to be added together with the next intensity density from MM1 320.

According to the formula described above, each output of the Accumulating Register 340 must be compared with a limit value. The value of a Limit Register 380 is compared on every cycle of Read Counter 310 with the current sum of the past J density values as provided by the Accumulating Register 340. Thus, a comparator circuit COMP 370 takes as input the output of Accumulating Register 340 and the value of the Limit Register 380. A positive output from COMP 370 indicates that the value from the Accumulating Register has either met or exceeded the value of Limit Register 380. A positive output at COMP 370 causes several other circuit elements to respond:

1) The Accumulating Register 340 is reset to zero so that it can begin the next cycle with a cleared state to accumulate the next set of intensity densities.
2) The Limit Register 380 is loaded with a new Limit value for comparing with the next set of intensity densities (i.e., the level has changed); and
3) A Write Counter 360 is incremented to a new value.

A positive output from COMP 370 causes a Write Counter 360 to increment its current value and thus, update the Memory Data Register MDR2 357 with a new value. The activation of a Write (WR) control line also causes a Memory Address Register MAR2 355, which receives its value from MAR1 325, to index MM2 350 so that the mapping value from Write Counter 360 can be written to it. Write Counter 360 will count from 0 to 255 where an 8-bit companded intensity is desired for each pixel, which represents the 256 levels to which companding is achieved. Read Counter 310 which passes its value (0 to 1023) onto MAR1 325 also passes its value onto MAR2 355 for servicing table MM2 350, but does so with a one clock cycle delay. The one clock delay is provided by a delay element 315 coupled between MAR1 325 and MAR2 355. Since the range ends when the limit value is exceeded, the delay is desirable so that the previous value of read counter 310, rather than the value at which COMP 370 returns a positive, is sent to MAR2 355.

For example, if the level 0 range is original intensity values 0 through 23, the COMP will return a positive (indicate an exceeding of the limit) only when the read counter has progressed to 24. However, since an original value 24 belongs now to a mapped value or level of 1, the delay is needed so that 24 is not also mapped to zero. As mentioned above, MDR2 357, which loads it contents into MM2 350 at a location indexed by MAR2 355 takes on the current value of Write Counter 360. Since Write Counter 360 is incremented only on a COMP 370 returning a positive comparison, all previous values will be filled with the same value. Table 1 below summarizes one exemplary iteration of the FIG. 3 circuit:

TABLE 1

| COMP | Limit | Read Counter 310 | MAR1 325 | MAR2 355 | Write Counter 360 | MDR2 357 |
|------|-------|------------------|----------|----------|-------------------|----------|
| No   | T     | 0                | 0        | 0        | 0                 | 0        |
| No   | T     | 1                | 1        | 0        | 0                 | 0        |
| No   | T     | 2                | 2        | 1        | 0                 | 0        |
| No   | T     | •                | •        | •        | •                 | •        |
|      |       | •                | •        | •        | •                 | •        |
|      |       | •                | •        | •        | •                 | •        |
| No   | T     | 23               | 23       | 22       | 0                 | 0        |
| Yes  | T     | 24               | 24       | 23       | 0                 | 0        |
| No   | 2T    | 25               | 25       | 24       | 1                 | 1        |
| No   | 2T    | 26               | 26       | 25       | 1                 | 1        |

In the above example, we assume that the value T, the Lowest Limit is exceeded for intensity value 24, thus, 0–23 fall within the first level. Due to the one cycle delay, at 24, the MAR2 355 is at 23 which filled to 0. Thereafter, for the next level from 24 on, the write counter has a value of 1. Further, when read counter 310 is at 24, the limit is modified to 2T. (When the density counters of original intensity values 24, 25, 26, . . . , etc. have exceeded 2L, the write counter will again be incremented to 2, with the values in that range (level or k=2) mapped to 2.

The Limit Register holds a different value with each new set of or range of summed intensity densities, i.e., the reaching of a new level. At each positive output of COMP 370 a load line is activated which will load the value of a register REG 395. REG 395 stores the result value of an adder ADD 390 which takes as one input the current value of Limit Register 380 and as the other input a fixed value T (Lowest Limit). Upon the positive comparison of a certain range of intensity densities, the Limit Register is incremented by the value T, which represents the Lowest Limit. Since Limit is initialized with a value of equal to the fixed value T (Lowest Limit), upon each successive positive comparison, the Limit Register will be T, 2T, 3T, 4T, etc. which also corresponds to the levels 0, 1, 2, respectively to which original intensity values are being mapped. In accordance with the formula discussed earlier, $$T = \frac{(M * N)}{2^J}.$$

Figure 4:
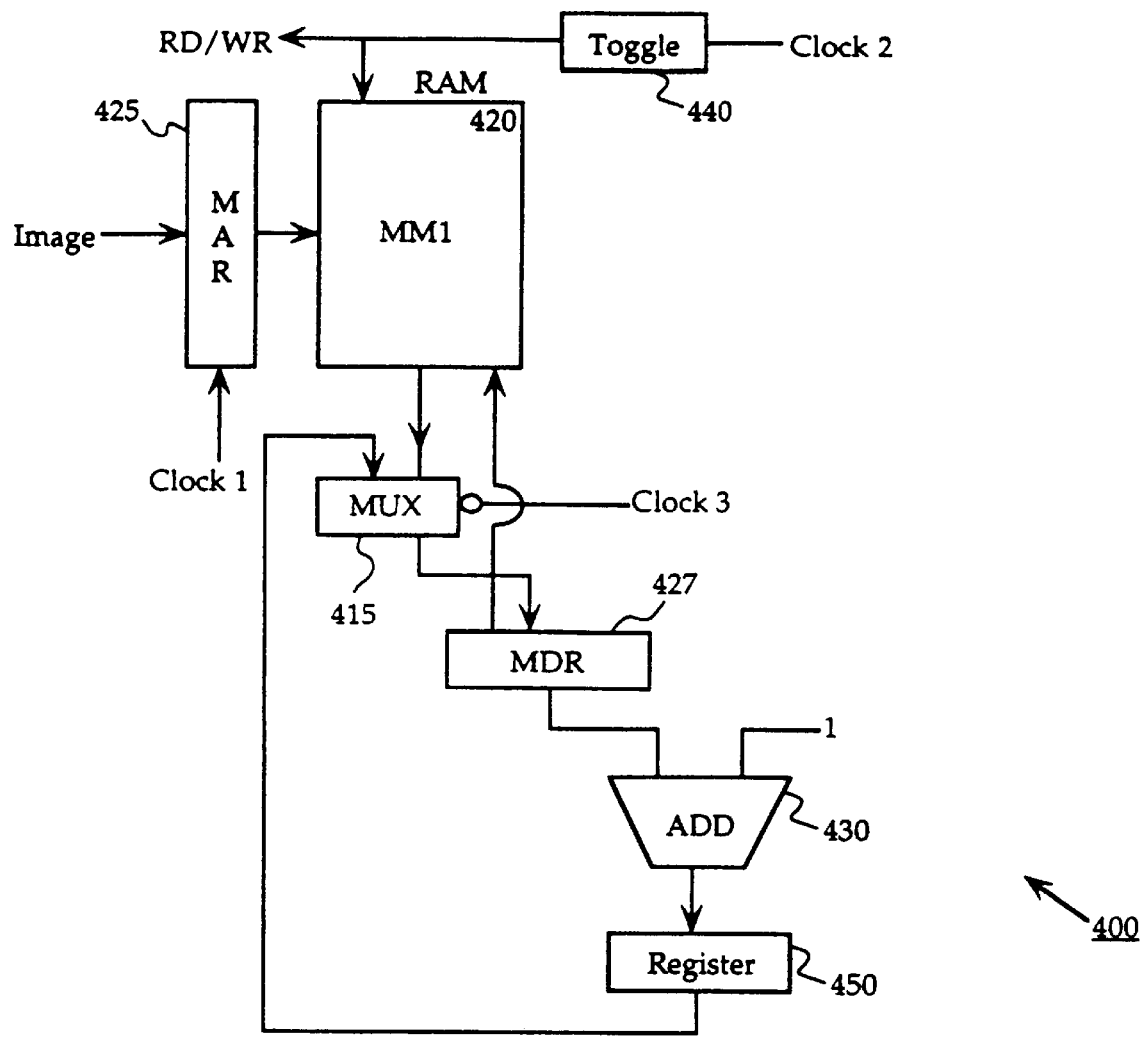
FIG. 4 illustrates a circuit for compiling the density of each intensity value as distributed in the original captured image.

FIG. 4 illustrates a circuit for compiling the density of each intensity value as distributed in the original captured image.

Figure 5:
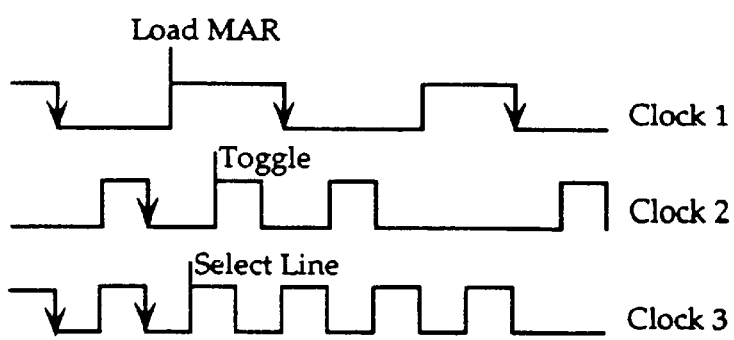
FIG. 5 illustrates the clocking of FIG. 4.

A compiling circuit 400 for compiling the density of each possible intensity includes three clocking signals Clock 1, Clock 2 and Clock 3, the relationship between which is illustrated in the clocking diagram of FIG. 5. The density values are stored in table MM1 420 (to become, when complete MM1 320 of FIG. 3) that is indexed by the values 0 to $2^{(L-1)}$ which represent each L-bit captured intensity value. A Memory Address Register MAR 425 and Memory Data Register 427 service MM1 420 similar to the MARs and MDRs that service MM1 320 and MM2 350. As the image is being captured, or from an array that stores the entire captured image each pixel intensity is sent to MAR 425. At each trailing edge of Clock 1, the next pixel's intensity value is read into MAR 425 to index MM1 420. Depending upon the value of a Toggle 440 the activity of MM1 420 will either be a read out of the current density count for the addressed intensity to MDR 427 or a write to the MM1 420 from MDR 427. Thus, as illustrated by the two-way arrows from MDR 427 to MM1 420, MM1 420 performs both read and write functions. When the density count for a particular intensity is to be incremented, the current value of the density count for that intensity is read out into MDR 427. The read from MM1 420 into MDR 427 is achieved by the Toggle 440 sending a RD (read) control signal to MM1 427. The value read out from MM1 420 is passed as input to an adder ADD 430. A hardwired value of "1" is passed as the other input to ADD 430 whose output is then held in Register 450. This will increment by "1" the current value of the density count for a particular intensity. When the increment operation is complete, a select signal (Clock 3) transitions to cause MDR 427 to load the value of Register 450 through a multiplexer (MUX) 415. The select line of MUX 415 is controlled by Clock 3 which will alternately select MM1 420 or the Register 450 as the input to MDR 427. The value of Register 450 is the updated density count for the intensity indexed by MAR 425.

The value of MAR 425 does not change until the value in MDR 427 as obtained from Register 450 has been written back into MM1 420. The write back is achieved by the Toggle 440 switching from a "0" (a RD or read signal) to a "1" (WR or write signal). The value of MDR 427 is written back to the same address from which the previous read from MM1 420 occurred since Clock 1 has not transitioned yet (see FIG. 5). In this manner, the density count for an intensity value from the image is updated. The process continues for every pixel in the image until a full accounting of the density of each intensity value is achieved. The final result will be a density table which can be used in the circuit of FIG. 3 (MM1 320 of FIG. 3). To guarantee that those intensity values that are not present in the image have a zero count, the table MM1 420 should be flushed by writing a zero to each entry prior to the start of the density count operation.

FIG. 5 illustrates the clocking of FIG. 4.

A first clock signal Clock 1 has the lowest frequency and sends upon each trailing edge a signal to load MAR 425 of FIG. 4. Every instance of Clock 1 indicates that a new pixel's intensity value may be compiled into table MM1 420. A second clocking signal Clock 2, activates Toggle 440 switching its state from 0 to 1, 1 to 0 and so on upon every trailing edge such that the table MM1 420 is either written to or read from. The RD/WR control line shown in FIG. 4 is essentially stated by Clock 2 and allows table MM1 420 to read and write in an alternating fashion. Clock 2 has a frequency double that of Clock 1. Finally, a third clocking original, Clock 3 is shown which controls the select line of MUX 415 such that alternatively, MUX 415 can select between the input from Register 450 or the input from MM1 420. It is slightly delayed/out of phase with Clock 2 such that the incrementing operation can complete prior to a new value being loaded from Register 450.

Figure 6:
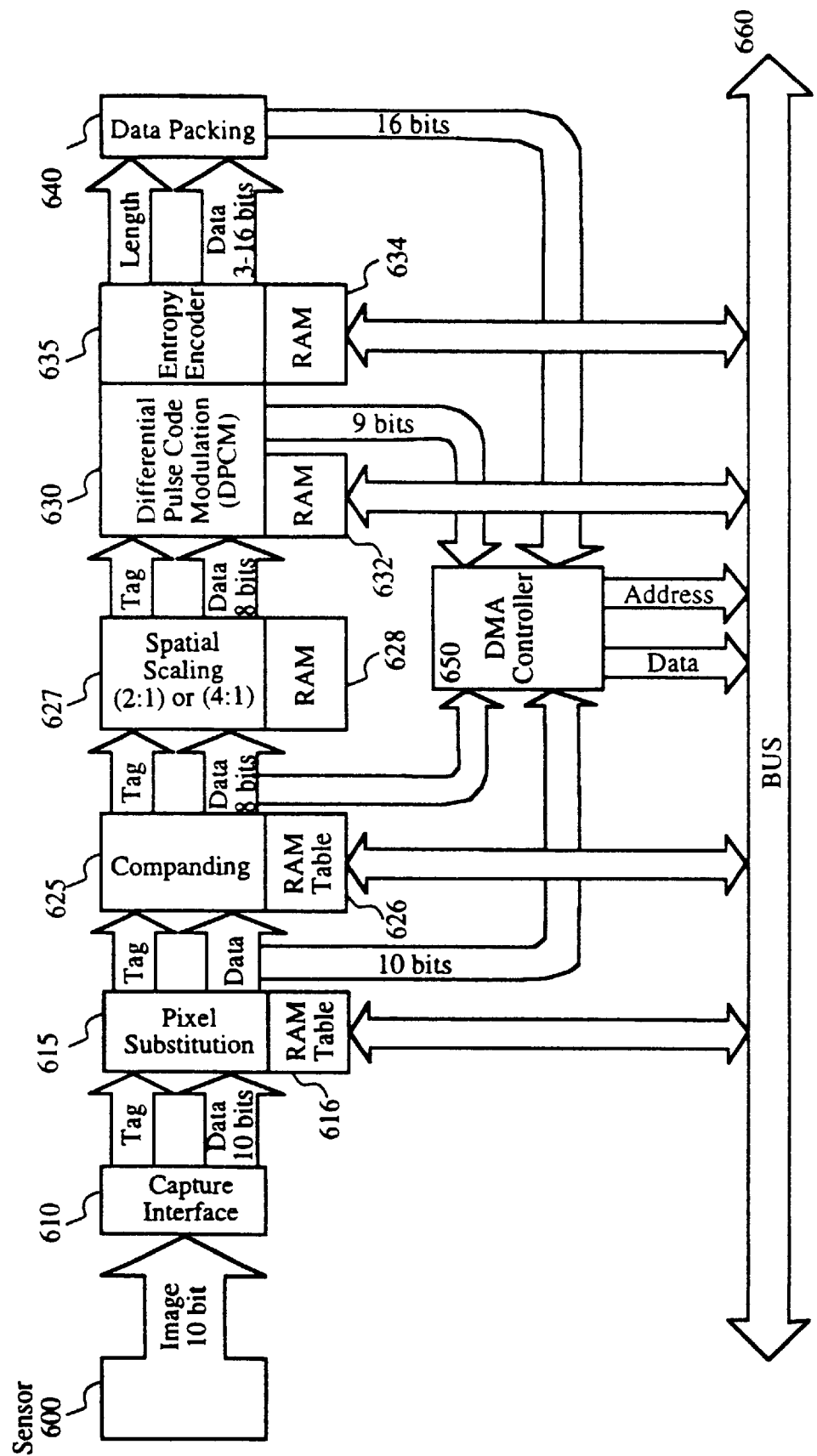
FIG. 6 is a diagram according to a third embodiment of the invention.

FIG. 6 is a diagram according to a third embodiment of the invention.

FIG. 6 is a block diagram of internal image processing and compression components of an image capture device. A sensor 600, generates pixel components which are color/intensity values from some source. The 10-bit pixel intensity values generated by sensor 600 are sent to a capture interface 610. Sensor 600 in the digital camera application, will typically sense either R, G, or B components from one "sense" of an area or location. However, the invention in one embodiment is used to convert gray scale intensity values rather than color values from R, G and B sensing. Capture interface 610 captures the image generated by the sensor and appends TAGs identifying color components for the pixels with individual pixels. The TAGs are two bits each, for example, 00, 01, 10 and 11 for R (Red), G1 (even-row Green), G2 (odd-row Green), B (Blue) pixels, respectively. The algorithm can work independently in each color plane for such a color image. In the case of a gray scale image, the tagging mentioned above is unnecessary since intensity values of only one color are present in the image.

It is typical in any CMOS (Complementary Metal-Oxide Silicon) or CCD (Charge Coupled Device) sensor that some of the pixel cells in the sensor plane may not respond to the lighting condition properly. As a result, the pixel values generated from these cell may be defective. These pixels are called "dead pixels." The "pixel substitution" unit 615 replaces each dead pixel by the immediate previously valid pixel in the row.

A RAM table 616 consists of the row and column indices of the dead pixels, which are supplied by the sensor. This RAM table 616 helps to identify the location of dead pixels in relation to the captured image. Companding module 625 is a table look-up based converter to convert each original pixel of 10-bit (labeled 10*b*) intensity captured from the sensor to an 8-bit intensity value. A RAM table 626 accompanies companding module 625 and contains the entries of the companding table.

As described in various other embodiments above, the invention provides an intelligent companding method and apparatus such that the resulting 8-bit image maintains important image features and characteristics after being companded. RAM table 626 is the same table as MM2 350 in FIG. 3 when that table is completed. The companding or mapping table 626 gives a mapped 8-bit value for each 10-bit intensity from the pixel substituted data from module 615. The companding module 625 completes the companding process by looking up the mapped value for each original intensity value (using that intensity value as an address) of a pixel and writing back the mapped intensity value for that pixel into the image array. Since RAM table 626 is dependent upon the makeup of the image being companded, the reduction in contrast will be uniform throughout the image such that the transformation from a brighter image to darker image (in the case of gray scale) will not be destructive of important image features such as edges. As shown in FIG. 6, the RAM table 626 may be accessed, either read or write, over a BUS 660, and thus the circuitry of FIGS. 3 and 4 may originate entirely external to the Companding module 625 itself, or be distributed between module 625 and other external circuitry, or can be entirely integrated into the Companding module 625.

Next, a spatial scaling unit 627 is used to scale down the original image. If the original image size is M×N, the 2:1 scaling operation scales the image size down to M/2×N/2 and the 4:1 scaling operation scales it down to M/4×N/4. This allows for compaction of image which may be undesirably large. RAM 628 accompanies spatial scaling unit 627 and is used for intermediate storage during the scaling operation. For example, 4:1 scaling can be implemented by successively applying 2:1 scaling operation twice.

Once pixel component data is scaled, it is passed to a DPCM unit 630 and an entropy encoder 635. DPCM unit 630 and entropy encoder 635 perform image compression by generating an error image and quantizing that error. The quantized error values are entropy encoded by looking up corresponding codewords in RAM 634. The encoded data, which is then of a variable or fixed length for each original error value is then packed together by a data packing unit 640 and then out to DMA controller 650 for transfer across BUS 660. Bus technology, addressing protocols and DMA controllers are well-known in the art of system design and can be readily modified/specialized to fit the desired application.

Each of the RAM tables 616, 626, 628, 632 and 634 can directly communicate with bus 660 so that their data can be loaded and then later, if desired, modified. By preloading data into those tables, and by using intelligent companding methods as described in various embodiments of the invention, image quality is enhanced and the overall cost of the system is reduced by using memory tables rather than expensive circuitry to perform every operation required in the image capture and conversion process.

Figure 7:
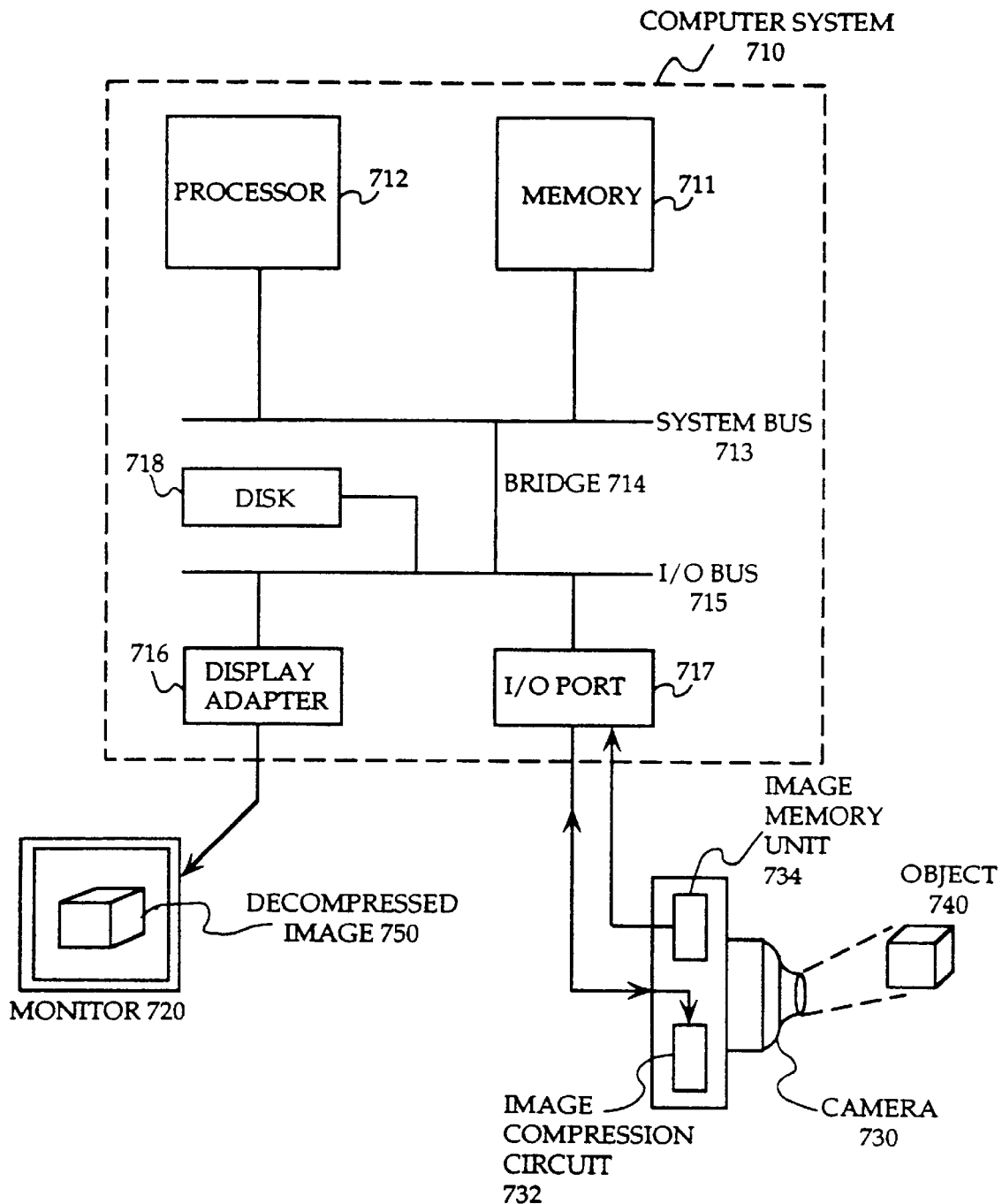
FIG. 7 is a system diagram of one embodiment of the invention.

FIG. 7 is a system diagram of one embodiment of the invention.

Illustrated is a computer system 710, which may be any general or special purpose computing or data processing machine such as a PC (personal computer), coupled to a camera 430. Camera 730 may be a digital camera, digital video camera, or any image capture device or imaging system, and is utilized to capture a sensor image of an object 740. Essentially, captured images are compressed by an image compression circuit 732 so that they can be efficiently stored in an image memory unit 734, which may be a ROM, RAM or other storage device such as a fixed disk. The image contained within image memory unit 734 that is destined for computer system 710 is enhanced in that the reduction in image feature due to prior art companding methods is greatly reduced by taking into account the original distribution of pixel intensities when companding. In most digital cameras, images are stored first and downloaded later. This allows the camera 730 to capture the next object quickly without additional delay.

As described above, image companding is one part of the entire image capture/compression process and has been improved upon from the prior art in the various embodiments of the invention. Image companding is carried out within the image compression circuit 732 in this embodiment of the invention. The decompression of the image compressed and stored in Image Memory Unit 734 is achieved using a processor 712 such as the Pentium™ (a product of Intel Corporation) and a memory 711, such as RAM, which is used to store/load instruction addresses and result data. The application used to decompress the image may be an executable file compiled from source written in a language such as C++. The instructions of that executable file, which correspond with instructions necessary to decompress the image, may be stored to a disk 718 or memory 711. It would be readily apparent to one of ordinary skill in the art to program a computing machine to decompress an image given that the original compression methodology is known.

Computer system 710 has a system bus 713 which facilitates information transfer to/from the processor and memory and a bridge 714 which couples to an I/O bus 715. I/O bus 715 connects various I/O devices such as a display adapter 716, disk 718 and an I/O port 717, such as a serial port. Many such combinations of I/O devices, buses and bridges can be utilized with the invention and the combination shown is merely illustrative of one such possible combination.

When an image, such as an image of object 740, is captured by a sensor, the sensor captures for each pixel, a gray scale intensity value (or one of R, G, or B components for color capture) and these pixel intensity values are then sent to the image compression circuit 732. Image compression circuit 732 consists of ICs and other components which execute, among other functions, the companding of the captured image. The companding process, as described earlier, first tallies the density count or number of occurrences of the possible intensity values in the image of the object 740 as captured by the sensor of camera 730. Then, a mapping table is obtained by calculating the mapped values based on the density or occurrence of each intensity value. Finally, another circuit such as the Companding circuit 625 of FIG. 6 will look up and replace each original intensity value with a corresponding mapped intensity value which is of a lower bit resolution. Once all pixel intensity values are accounted for, and the companding and other compression functions such as entropy encoding are complete, the camera 730 can capture the next image. When the user or application desires/requests a download of images, the compressed images stored in the image memory unit are transferred from image memory unit 734 to the I/O port 717. I/O port 717 uses the bus-bridge hierarchy shown (I/O bus 715 to bridge 714 to system bus 713) to temporarily store the compressed image data into memory 711 or, optionally, disk 718.

The compressed images are decompressed by suitable application software (or hardware), which may utilize processor 712 for its execution.

Decompressed image 750 may then be rendered visually using a display adapter 716 onto a monitor 720 to which the computer system 710 may be connected. As discussed earlier, the decompressed image will have more visually accurate features than prior art decompressed images due to the enhancement in the companding process described with regard to various other embodiments of the invention. The end result will be a higher quality decompressed image 750 displayed onto monitor 420 as compared with prior art companding schemes even if they also use other similar compression technology.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method for companding a captured image comprising the steps of:

determining the aggregate density within said captured image of S-1 intensity values, wherein determining includes:

measuring the density of each of said S-1 intensities; and summing said densities of all said S-1 intensities, said S-1 intensities, a subset of all possible intensity values with said captured image;

determining the aggregate density within said captured image of S intensity values, said S intensity value, a subset of all possible intensity values within said captured image;

mapping said S-1 intensity values to a mapped intensity level if the aggregate density of said S intensity values at least meets a limiting value and if the aggregate density of said S-1 intensity values is lower than said limiting value, said limiting value a function of the bit resolution of the desired companded image and of the mapped intensity level, when said determining the aggregate density within said captured image of Sth intensity values includes:

measuring the density of the Sth intensity; and summing said density of the Sth intensity value with said aggregate density of said S-1 densities.

2. A method according to claim 1 wherein the step determining the aggregate density of S intensities includes the steps of:

measuring the density of the Sth intensity; and summing said density of the Sth intensity value with said aggregate density of said S-1 intensities.

3. A method according to claim 1 wherein each possible intensity value of said captured image is mapped to lower resolution intensity value, said mapped lower resolution intensity values composing the set of possible intensity values of the companded image.

4. A method according to claim 1 wherein said steps are repeated until all intensity values for said captured image have been mapped.

5. A method according to claim 1 wherein each pixel of said captured image is replaced by a pixel of a mapped intensity value.

6. An apparatus comprising:

a mapping circuit configured to map a range of captured intensity values to a companded intensity level based upon the density of each possible intensity value in accordance with their occurrence in said captured image;

a companding circuit coupled to said mapping circuit, said companding circuit configured to replace each pixel of said captured image with a corresponding mapped intensity value pixel;

a first memory configured to store and update a density count for each captured intensity value, said memory indexed by said captured intensity value;

a second memory configured to store a mapped intensity value for each said captured intensity value, said memory indexed by said captured intensity value;

a density count circuit configured to count and store the density of each said captured intensity value; and said first memory is coupled to a read counter, said read counter providing indexing values enabling the reading from said first memory into a first memory data register.

7. An apparatus according to claim 6 further comprising an adder coupled to said first memory data register and configured to receive one input therefrom; and an accumulating register coupled to said adder, said accumulating register accepting the output of said adder and feeding back said output as an input thereto.

8. An apparatus according to claim 7 further comprising:

a limit circuit, said limit circuit configured to provide a limit value corresponding to current the mapped intensity level.

9. An apparatus according to claim 8 further comprising a comparator circuit said comparator circuit outputting a positive match when the value in said accumulating register exceeds said limit value.

10. An apparatus according to claim 8 further comprising a write counter coupled to said comparator circuit, said write counter configured to increment its value upon the comparator circuit indicating a positive match.

11. An apparatus according to claim 9 wherein a positive match resets said accumulating register to zero.

12. An apparatus according to claim 9 wherein said limit circuit generates a new limit value equal to the previous limit value incremented by the limit value corresponding to zero level mapped intensity upon said positive match.

13. An apparatus according to claim 6 wherein said second memory is coupled to a write counter, said write counter providing mapped intensity values written to said second memory.

* * * * *